D. H. ROBBINS ET AL 3,240,115

PHOTOGRAPHIC APPARATUS

Filed Dec. 1, 1961

March 15, 1966     D. H. ROBBINS ET AL     3,240,115

PHOTOGRAPHIC APPARATUS

Filed Dec. 1, 1961     8 Sheets-Sheet 5

United States Patent Office 3,240,115
Patented Mar. 15, 1966

3,240,115
PHOTOGRAPHIC APPARATUS
Daniel H. Robbins, Milfred H. Craft, and Thomas M. Madigan, Jr., all of Rochester, N.Y., assignors, by mesne assignments, to Itek Corporation, Lexington, Mass., a corporation of Delaware
Filed Dec. 1, 1961, Ser. No. 156,359
3 Claims. (Cl. 88—24)

This invention relates to photographic apparatus. In particular, the invention relates to apparatus for viewing an enlarged image of a small transparency, and for making an enlarged photographic print of the transparency. More specifically, the invention relates to photographic equipment now referred to in the art as a microfilm reader-printer.

In recent years, the use of microfilm as a means for recording information has become widespread. One of the problems, that is associated with microfilm, and that has not as yet been solved in a completely satisfactory manner, is the retrieval of information from the microfilm. One phase of this problem is that of obtaining, in a convenient, efficient manner, enlarged reproductions of microfilmed information.

One object of the present invention is to provide a microfilm reader-printer that is simple in its construction and operation.

Another object of the invention is to provide a microfilm reader-printer that provides brilliant, enlarged reproductions for viewing and that also provides high quality enlarged photographic reproductions.

A further object of the invention is to provide a practical microfilm reader-printer that can make enlarged photographic reproductions rapidly, and ready for immediate use.

Another object of the invention is to provide a practical microfilm reader-printer that performs the functions required of such a device in a satisfactory manner, and that has relatively few moving parts, and a fundamentally simple and clean design.

Still another object of the invention is to provide a practical microfilm reader-printer that will provide high quality photographic reproductions, and that is economical to operate.

A further object of the invention is to provide a practical device for making good photographic reproductions from microfilm, that can produce such reproductions in different sizes. A related object of the invention is to provide such a device that is economical to manufacture and use, that will produce clear reproductions, and that has an attractive appearance and sound design.

Another object of the invention is to provide a microfilm reader-printer that will produce printed reproductions of great clarity by a wet reproduction process, that is economical to use, that is convenient to operate, and that is designed for maximum operator convenience and utility.

Another object of the invention is to provide a microfilm reader-printer that can be operated from either a seated or standing position and that is convenient to use from both positions.

A related object of the invention is to provide a microfilm reader-printer that has an engineering design and reproduction system that permits an attractive appearance, convenient and safe loading of the machine with necessary reproduction supplies, easy access to the mechanical parts for routine maintenance and any necessary repairs, and that is flexible and versatile in its capabilities.

Another object of the invention is to provide a microfilm reader-printer that can print from a variety of negatives and that can produce many different types of printed reproductions.

A more specific object of the invention is to provide a microfilm reader-printer that uses a wet process silver halide reproduction system, that has an engineering design with inherent convenience and safety features, that can produce photographic reproductions at any desired enlargement, that can utilize photosensitive material in the form of rolls of any desired width, that produces the reproductions at any desired lengths, and that is economical to operate.

Another object of the invention is to provide a microfilm reader-printer that can produce photographic reproductions on translucent sheet material, so that the reproductions can be used as a drafting room tool for the production of quantities of inexpensive diazo prints.

Another object of the invention is to provide a photographic reproduction mechanism that can produce prints at any desired, preselected lengths, that automatically produces prints cut to the proper lengths, and that is economical to operate and involves the least possible uneconomic use of paper.

Another object of the invention is to provide a practical microfilm reader-printer that is convenient for making photographic reproductions on an enlarged scale from microfilm and that is fully automatic in its print-making operation, and that can be used as a reader, for viewing images on microfilm, even while a photographic reproduction is being made.

Other objects of the invention will be apparent hereinafter from the specification and from the recital of the appended claims.

A microfilm reader-printer, that is constructed in accordance with one embodiment of this invention, is in the form of a console that is built into its own table. An optical projection system is provided that can receive microfilm in the form of aperture cards or chips mounted in acetate jackets, and project a brilliant image onto a screen for viewing, or, at the command of the operator, onto photosensitized paper for reproduction. The photographic reproduction system includes means for holding photosensitive paper, that is withdrawn from a supply roll, in a projection plane during exposure. Means are also provided for automatically advancing the exposed portion of the photosensitive paper, while simultaneously bringing unexposed paper into the projection plane, automatically cutting off the exposed portion, and then feeding the exposed paper through a processing unit, removing any excess processing chemicals, and delivering a finished, trimmed print in substantially dry form.

Details of the invention will be better understood by reference to the specific embodiment thereof that is illustrated in the drawings that form a part of this application.

Figure 1:
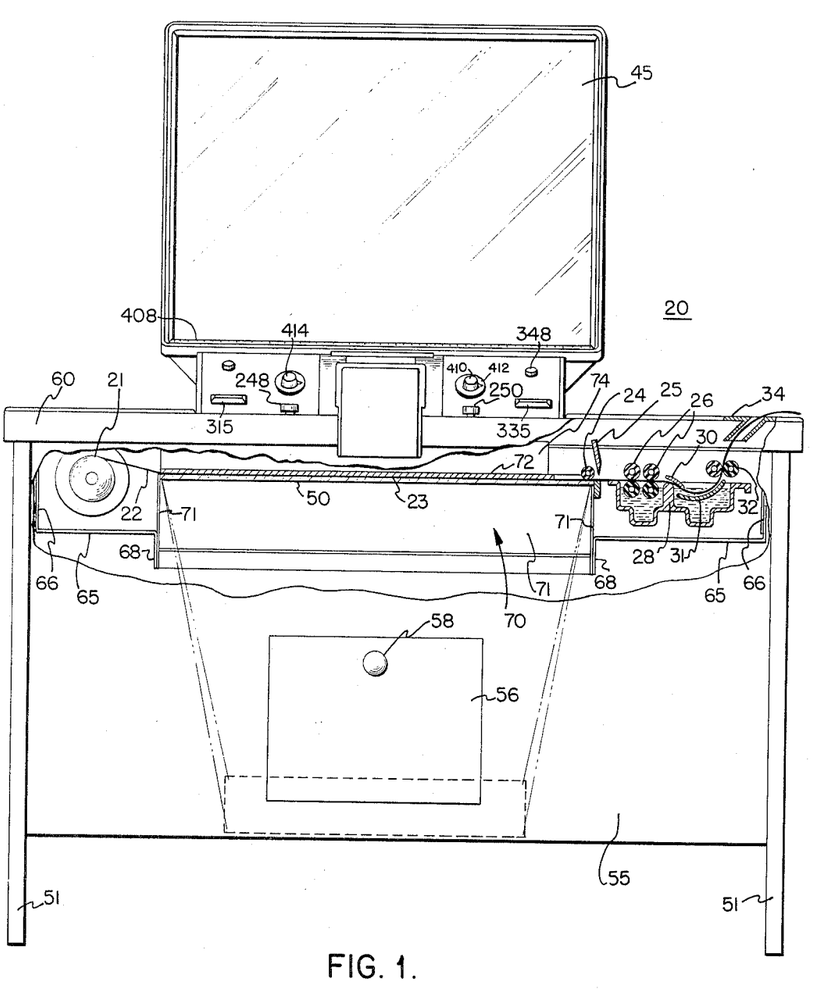
FIG. 1 is a front elevation of a microfilm reader-printer that is constructed in accordance with one embodiment of this invention, and that is partly broken away to show in schematic form the important components of the photographic reproduction system, and also showing in dashed lines the path of light rays that are reflected from a mirror in the bottom of the reader-printer cabinet up to an exposure or focal plane.
Figure 2:
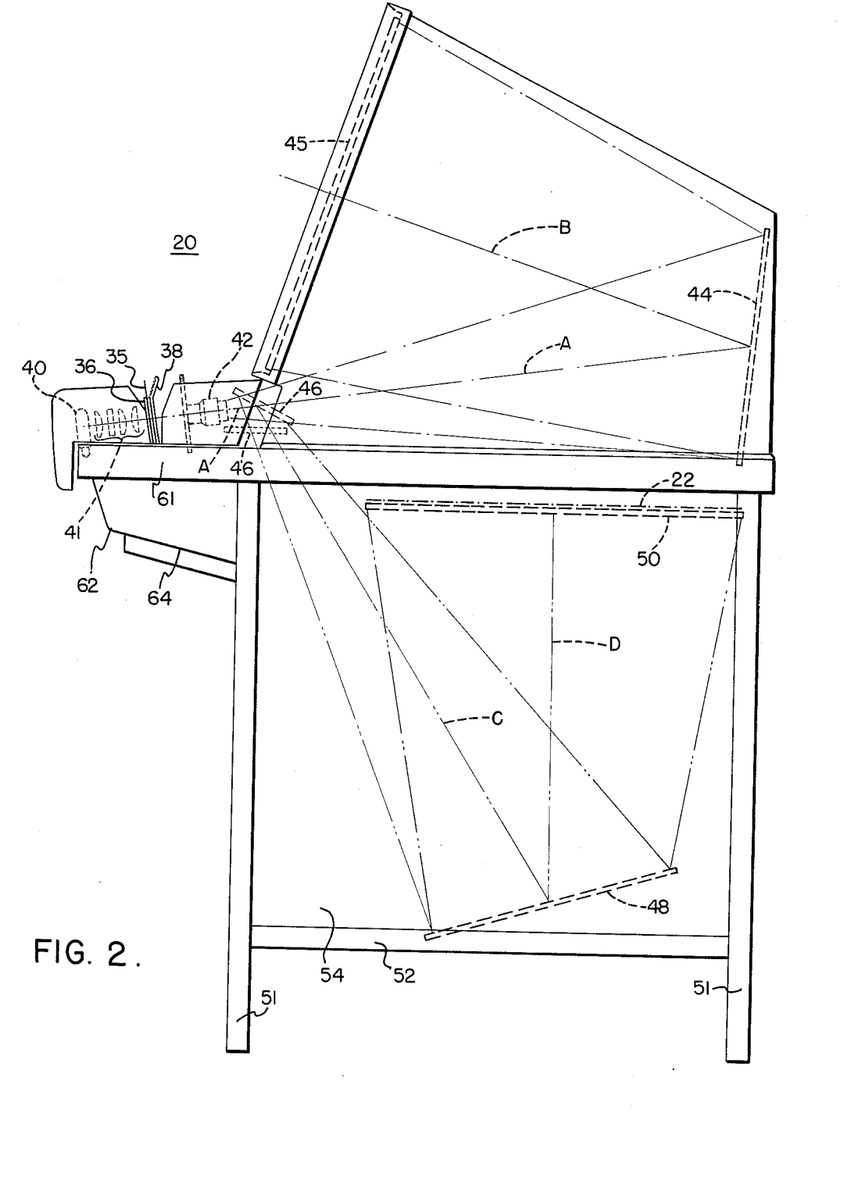
FIG. 2 is a side elevation of the reader-printer, showing the optical system schematically in dotted lines, and also showing in dotted and in dashed lines, respectively, the lower, non-intercepting position and the upper, intercepting position of the moveable mirror and the two paths that can be followed by the projected light rays that constitute the image, that is, either to the viewing screen, or onto the exposure or focal plane for photographic reproduction.

Referring now to the drawings in detail by numerals of reference, and particularly to FIGS. 1 and 2, the numeral 20 denotes the reader-printer generally. The reader-printer is designed to use photosensitive sheet material from a supply roll 21. The photosensitive material preferably comprises paper 22 that is coated on one surface with a sensitized coating, and that is led from the roll 21 with the snsitive coating disposed downwardly. The paper is engaged by, and can be drawn through an exposure plane 23, by transport rollers 24. Exposed paper can be advanced under a knife 25 and into the transport and processing liquid applicator rolls 26. An exposed, cut sheet is fed from the applicator rolls 26 between guide members 28, 30, into a tray of photographic processing liquid, through which it is guided by a vane 31 into the nip of a pair of squeegee rolls 32, from which it is passed upwardly through a chute 34 as a finished, substantially dry print.

Referring now particularly to the optical paths and components shown in FIG. 2, to view a transparency 35, such as a piece of microfilm that is mounted on an aperture card or in an acetate jacket, the transparency is disposed between the transparent holder plates 36, 37. Light rays are projected from a lamp 40 through a condenser assembly 41, through the transparency 35, and then through a lens system 42, emerging therefrom in a path about the optical axis A.

To use the device for viewing the transparency, the image of the transparency is projected in the path about the optical axis A to a mirror 44, at the back of the reader-printer cabinet, from which the light rays are then projected along a path about an optical axis B onto the viewing screen 45. The viewing screen 45 may be formed of frosted glass or the like. To use the device for reproducing an image from a transparency, a mirror 46 is moved from its lower, dotted line position shown in FIG. 2, to its upper, dashed line position shown in FIG. 2. The light rays that are projected from the lens system 42 about the optical axis A are then intercepted by the mirror 46, and are reflected downward in a path about the optical axis C onto a mirror 48 that is mounted in the base of the reader-printer cabinet. The light rays are reflected upwardly from the mirror 48 in a path about the optical axis D, through a flat transparent plate 50 of glass or the like, and onto the photosensitive coating of the paper 22, to expose the photosensitive paper and to form a latent photographic image.

Specific details of the construction of the reader-printer will now be described. The reader-printer cabinet is supported on four legs 51. The side pairs of legs 51 are interconnected adjacent their lower ends by a crossbar 52 (FIG. 2). Rigid panels 54 cover both sides of the base of the reader-printer. A panel 55 covers the front of the base of the reader-printer, and is provided with an opening in which a door 56 is pivotally mounted to permit access for occasional entry into the interior of the reader-printer for any necessary maintenance and cleaning. The door 56 is provided with a knob 58 to facilitate opening and closing of the door. The back and base of the reader-printer are similarly enclosed by panels (not shown) to form a light-tight shell.

A generally rectangular framework is supported from the upper ends of the legs 51 and includes a front member 60 (FIG. 1) and a side member 61 (FIG. 2). Depending downwardly from the front framing member 60 is an inclined panel 62 (FIGS. 2 and 3), that is formed with a less inclined extension 64 that is secured to the front panel 55 of the base of the reader-printer.

A series of generally horizontally extended panel members 65, that are secured to vertical panels 66, are disposed to provide an opaque partition adjacent the sides of the reader-printer in its internal body cavity. The horizontal panels 65 are formed with downwardly depending extensions 68, and together are arranged to define a generally rectangular central opening 70.

Several panels 71 are mounted to extend upwardly from the downward panel extensoins 68, to provide walls about the opening 70, and to define a generally rectangular passage from the base of the reader-printer upward. A transparent glass plate 50 is mounted on the walls 71, at the top of the passage 70.

An opaque panel 72 (FIGS. 1, 7, 8 and 9) is formed with a pair of upright extensions 74 at its upper longitudinal sides, that in turn have horizontally extending lips 75 (FIG. 9) that engage upon upright frame members 76. The lips 75 are disposed to suspend the lower surface of the panel 72 a predetermined distance above the upper surface of the glass plate 50. This predetermined distance is sufficient to permit passage of the sensitized paper 22 between the confronting faces of the panel 72 and the glass 50, with sufficient clearance to permit easy movement of the paper yet sufficient closeness of spacing to confine the paper effectively to the exposure plane. Lifting tabs 78 (FIG. 8) are secured at intervals along the lengths of the lips 75, to facilitate removal of the panel 72 as necessary.

The panel 72 is opaque and extends over substantially the entire exposure plane in the predetermined spaced relationship to the upper surface of the glass plate 50. The arrangement of the panels 65, 66, 68, 71, and 72 is such as effectively to divide the interior of the cabinet into an upper chamber and a lower, dark chamber. At the delivery end of the exposure plane, as can best be seen in FIGS. 8 and 9, the panel 72 is formed with a plurality of generally rectangular recesses 80, through which the upper surface of the photosensitive paper 22 is exposed.

*Exposure, transport, and trimming mechanism*

The mechanism for permitting exposure of the paper, advancing it, and then cutting it, is arranged in the following way.

A bracket 81 (FIG. 8) is secured to the panel 64 by a threaded fastener 82. A mounting plate 84 is secured in an upright position to the bracket 81, and elsewhere (not shown). An electric motor 85 is mounted between the plate 84 and a panel 86 that is secured to the front frame member 60. The drive shaft 88 of the motor projects through the mounting plate 84. A pulley 90 is mounted on the drive shaft 88, and a belt 91 is mounted around the pulley to be driven by the pulley upon rotation of the drive shaft 88. A gear 92 is also mounted on the shaft 88 for movement upon movement of the shaft. The distal end of the shaft is journalled in a second mounting plate 94, that is secured to a bracket 95 that is in turn secured to the panel 64 by a threaded fastener 96.

Figure 7:
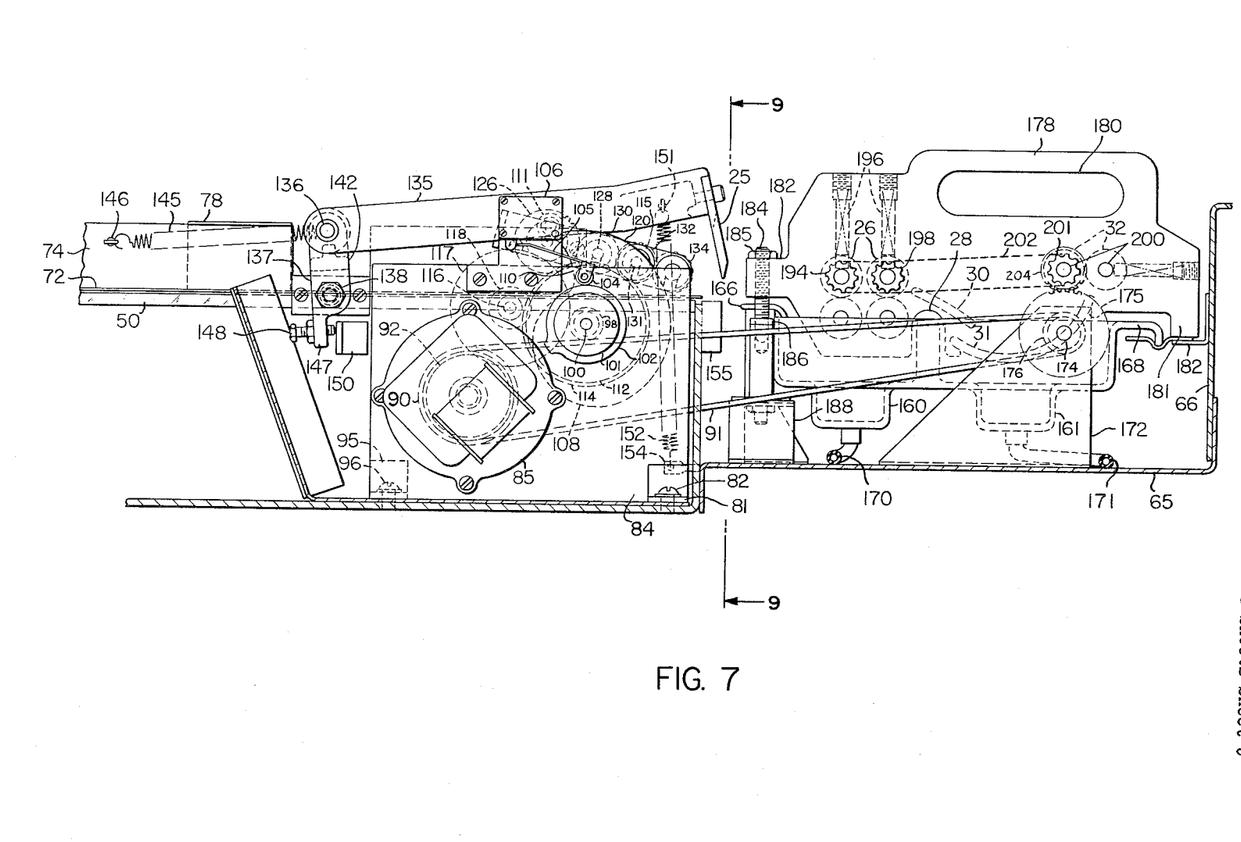
FIG. 7 is a fragmentary section, on an enlarged scale, of several portions of the photographic reproduction mechanism, including the paper transport, cutting, and developing parts of the mechanism.
Figure 8:
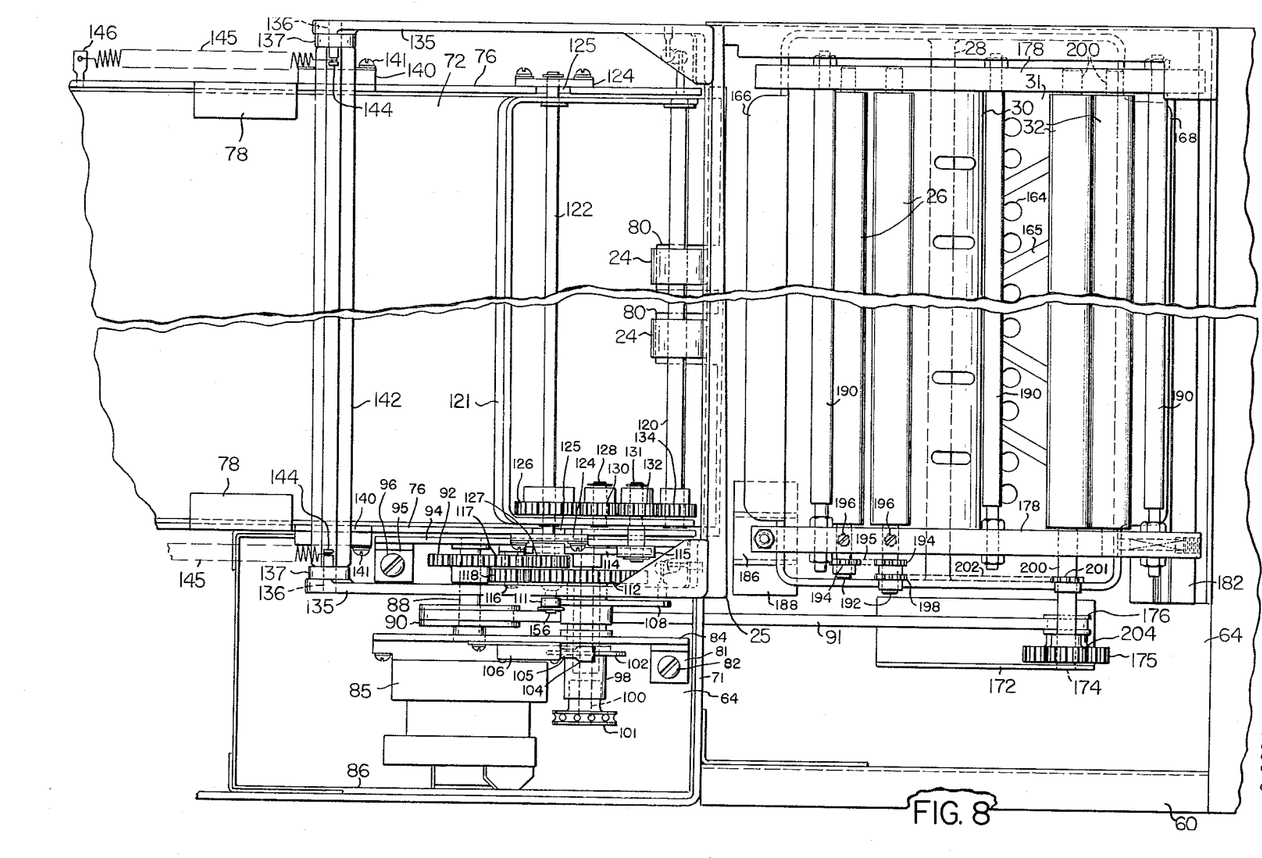
FIG. 8 is a fragmentary top plan view thereof.
Figure 9:
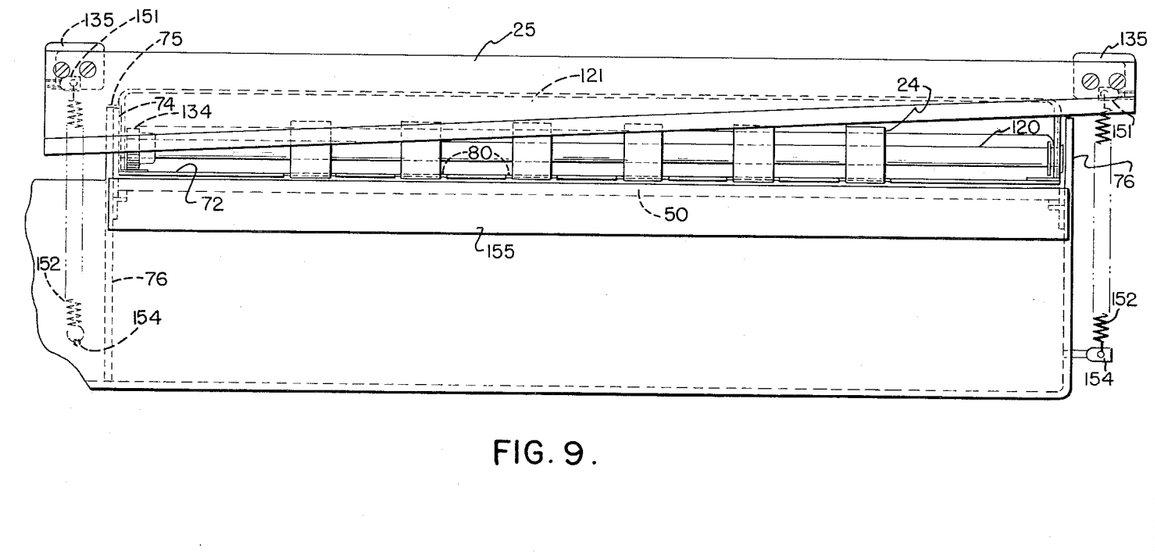
FIG. 9 is a fragmentary elevation taken substantially along the line 9—9 of FIG. 7, looking in the direction of the arrows.

Still referring primarily to FIGS. 7 and 8, a hollow shaft 98 is journalled in the mounting plate 84 for rotation about an axis that is substantially in parallelism with the axis of the drive shaft 88 of the motor 85. A smaller shaft 100 is mounted for rotation concentrically within the bore of the shaft 98. A one-way clutch (not shown) is interposed between the inner shaft 100 and the outer shaft 98, to permit clockwise movement of the outer shaft 98 relative to the inner shaft 100, and to prevent counter-clockwise relative movement of these shafts (relative to FIG. 7). A wheel 101 is mounted at the end of the shaft 100, and is secured to the shaft to permit clockwise rotation of the inner shaft 100 relative to the outer shaft 98, upon rotary adjustment of the wheel 101.

A cam 102, hereafter referred to as the motor holding cam 102, is mounted on the outer shaft 98 for rotation upon rotation of the shaft. A follower 104 is disposed to engage the surface of the cam 102. The cam follower 104 is connected through a lever 105 to a microswitch 106.

A second cam 108, hereafter referred to as the knife cam, is also mounted on the outer shaft 98, for rotation upon rotation of the shaft. The cam 108 is mounted intermediate the mounting plate 84 and the mounting plate 94. The cam 108 is formed with an almost radially-extending portion 110 (FIG. 7) in its camming surface. A follower 111 is disposed to ride along the periphery of the knife cam 108.

A pinion 112 is also mounted on the outer shaft 98, to rotate the shaft upon rotation of the pinion.

Adjacent the inner mounting plate 94, a cam 114, hereafter referred to as the paper feed cam, is mounted on the inner shaft 100, for rotation upon rotation of the shaft. A follower 115 is disposed to ride on the periphery of the paper feed cam 114.

A stub shaft 116 is journalled at its inner end in the mounting plate 94. A pinion 117 is mounted on the shaft 116, in engagement with the gear 92, to be rotated upon rotation of the gear 92, and to cause rotation of the shaft 116 as it is rotated. A gear 118 is also mounted on the shaft 116, axially spaced from the pinion 117, and for rotation upon rotation of the shaft. The gear 118 is disposed to engage the pinion 112 on the shaft 98, to rotate the pinion 112 and shaft 98 when it is rotated upon rotation of its own shaft 116.

The paper drive rollers 24 are secured to a shaft 120 that is journalled at its ends in the arms of a yoke 121. The yoke 121 is journalled on a shaft 122 that is in turn journalled at its ends in brackets 124, respectively, that are secured across recesses 125 in the frame member 76. A gear 126 is secured to the shaft 122 closely adjacent one arm of the yoke 121. The shaft 122 projects beyond the mounting plate 94 and above it, and at its outer end a pinion 127 is secured. The pinion 127 is disposed in engagement with the pinion 117, to be rotated upon rotation of the pinion 117, and to cause rotation of the gear 126 as it is rotated.

A stub shaft 128 is mounted on one arm of the yoke 121, adjacent the gear 126. A pinion 130 is journalled on the shaft 128 and is engaged with the gear 126, so as to be rotated upon rotation of the gear 126. Another stub shaft 131 is mounted on the same arm of the yoke 121, intermediate the shaft 120 and the stub shaft 128. A pinion 132 is journalled on the shaft 131, and is engaged with the pinion 130, to be rotated upon rotation of the pinion 130. The shaft 131 is extended outwardly of the yoke 121, and the follower 115 for the paper feed cam 114 is journalled on its outer end. Another pinion 134 is secured on an end of the shaft 120, and is disposed in engagement with the pinion 132, to be rotated, and to rotate the shaft 120, upon rotation of the pinion 132. The gear 126, and the pinions 130, 132, and 134, together form a gear train and are constantly in engagement.

The knife 25 is secured to and depends downwardly from the ends of a pair of arms 135, the other ends of which are pivotally mounted on a shaft 136. The shaft 136 is journalled at its ends between the upper ends of a pair of upstanding links 137, that are mounted at their lower ends on pins 138 (FIG. 7) that are secured in brackets 140 that in turn are secured by threaded fasteners 141 to the frame member 76. The two links 137 are rigidly interconnected by a member 142, to insure movement of the links together, as a unit. A pin 144 projects inwardly from the upper end of each of the links 137 respectively, and springs 145 are interposed between the pins 144 and other pins 146 (FIG. 7) respectively that are secured to the frame member 76.

Each of the links 137 is formed at its lower end with a downwardly projecting finger 147 (FIG. 7). A screw 148 is adjustably secured to project through each finger 147, and is disposed so that one end can abut against a stop member 150 (FIG. 7) that is secured to the frame, to limit pivotal movement of each link 137 in a counter-clockwise direction. The pins 136 form floating pivots for the knife arms 135, and the pins 138 provide fixed pivots for the links 137, and also for the knife arms 135.

Each of the knife arms 135 is also formed, adjacent the end where the knife 25 is mounted, with a pin 151 (FIG. 7). Springs 152 are interposed between these pins 151 and straps 154 that are secured to the frame, so that the springs 152 are disposed constantly to urge the knife 25 in a downward direction. An anvil 155 is secured to the frame in position to cooperate with the cutting edge of the knife 25.

The knife cam follower 111 is mounted for rotation on a shaft 156 that is secured in one of the knife arms 135.

The photographic processing section of the reader-printer is disposed in a section of the frame that has a floor 65 and a wall 66 (FIG. 7). The processing section includes a pair of tanks 160 and 161, for two different types of photographic processing chemicals. These two tanks are separated by a hump 28 that is curved at its upper end to serve as a guide. As shown in FIG. 8, the guide member 30, that cooperates with the hump 28 in guiding the paper between the two tanks, is perforated. Similarly, the vane 31, that is disposed to guide the paper through the tank 161, is formed with perforations 164 and with grooves 165. The guides 30 and 31 are supported at their lateral ends from the walls of the respective tanks 160, 161. The tanks 160, 161 are supported from the frame by lips 166, 168, that project from these respective tanks. The tanks can be connected through tubing 170, 171, to any suitable supply sources of processing liquids.

To drive the processing rolls, a bracket 172 is secured to the horizontal panel 65 that forms the floor of the processing section. A stub shaft 174 is journalled in the bracket 172. A gear 175 is mounted on the shaft 174, for rotation upon rotation of the shaft. A pulley 176 is also mounted on the shaft 174, to drive the shaft upon rotation of the pulley. The drive belt 91 is passed around the pulley 176, to drive the pulley when the drive pulley 90 is driven by the electric motor 85.

The mechanism for transporting the exposed photographic paper through the processing section is constructed in the following manner. A pair of thick, rigid members 178 provide sidewalls that are formed with openings 180 that provide convenient handholes for grasping the processing section to facilitate its removal. Each of the members 178 is formed with a leg 181 that seats on one part of a bracket 182 that is secured to the wall 66. Each of the members 178 is also formed with a projecting lug 182 at its opposite end, and a long screw 184 is threaded in an opening in one of the lugs 182 and can be locked in a preselected position therein by a nut 185. The long screw 184 projects downwardly through the lug 182 and is threaded into a threaded opening in a spacer 186 that is mounted on a bracket 188 that is secured to the floor 65.

Tie rods 190 (FIG. 8) secure the two members 178 together at spaced intervals. Two pairs of applicator rolls 26 are mounted between the two members 178, with the lower roll in each pair respectively being positioned at an elevation so that in ordinary operation of the processor, the lower rolls will be at least partly immersed in the processing solution in the tank 160, so as to apply the processing solution to the lower, sensitized surface of the photosensitive sheet as it passes between the rolls. The shafts 192 of the upper rolls of both pairs of rolls 26 project beyond the member 178, and sprockets 194 are mounted on the two projecting portions. A chain 195 is passed around both sprockets 194, so that the upper pair of rolls rotate together, in synchronism. In the manner well known in the art, adjusting screws 196 are provided in threaded openings in one of the wall members 178, to permit adjustment of the pressures with which the upper rolls engage the lower rolls in the two pairs of applicator rolls. Another sprocket 198 is mounted on an extension of one of the shafts 192, as shown in FIG. 8.

A pair of squeegee rolls 32 are mounted on parallel shafts 200. The ends of the shafts 200 are journalled in the members 178. The shaft 200 of one of the rolls 32 is extended beyond the member 178, and a sprocket 201 is secured on the projecting end of this shaft. A chain 202 is passed around the sprocket 201 and the sprocket 198, to move the rolls 32 in synchronism with the rolls 26. A pinion 204 is also mounted on the extension of the shaft 200 and is engaged with the gear 175, so as to rotate upon rotation of the gear 175.

*Optical system*

Figure 3:
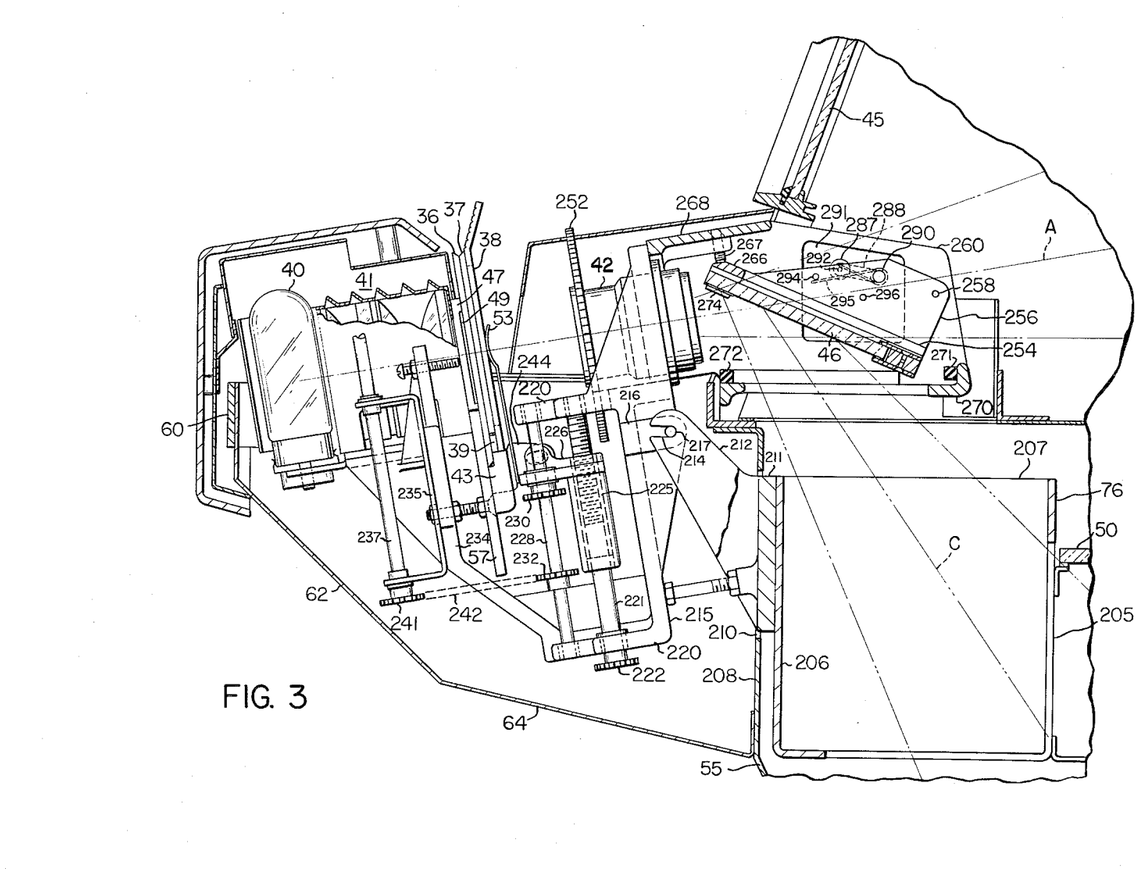
FIG. 3 is a section in a vertical plane, on an enlarged scale, of the optical projection system, with parts of the frame removed.

Referring now particularly to FIGS. 3 through 6, the optical system of the reader-printer is arranged in the following manner. As best shown in FIG. 3, a pair of upright, parallel panels 205, 206, that are rigid with the frame, are arranged together with another pair of upright panels 207, only one of which is visible in FIG. 3, and that are at right angles to the panels 205 and 206, to provide a generally tubular shape into which the light rays, that are arranged to follow a path about the optical axis C, can be directed. These panels are cut away, in the manner illustrated in FIG. 3, to provide an unobstructed pathway for the light rays to follow. This tubular structure confines the light rays and prevents light scattering inside the reader-printer.

Closely adjacent the front panel 206 is a framing panel 208, that is formed with an aperture 210. A strap 211 is secured to the panel 206 to project into the opening 210, and a pair of arms 212, one of which is mounted at each end of the strap 211, project upwardly and outwardly through the aperture 210. Each of these arms 212 is formed at its upper, outer end with a recess 214 (FIG. 3). The main frame 215, for supporting the optical system, is formed with a pair of bosses 216, from which pins 217 project. The pins 217 are engaged in the recesses 214 of the arms 212, and can be secured therein by set screws (not shown).

The frame 215 is formed with upper and lower arms 218 (FIG. 4) at one side, and with upper and lower arms 220 at its other side. A pair of shafts 221 are journalled between each of these pairs of upper and lower arms. Each of the shafts 221 is threaded adjacent its upper end. Each of these shafts 221 is formed with a lower end that projects below the lower arm in which it is journalled, and sprockets 222 are secured to these projecting lower ends of the shafts 221, to rotate the shafts 221 when the sprockets 222 are rotated. A chain 224 (FIG. 4) is passed around the two sprockets 222.

A pair of collars 225 are mounted about the shafts 221 respectively. The collars 225 are internally threaded and are engaged on the threads of the shafts. The collars 225 are elongate to provide a bearing surface of substantial length as each collar rides up and down on its shaft. Each of the collars 225 is formed adjacent its upper end with an extension or arm 226, and a horizontally-extending shaft 227 (FIG. 4) is rigidly secured between the two arms 226.

A pair of vertically-inclined shafts 228 are also journalled between the upper and lower pairs of arms 218, 220 respectively. A pair of sprockets 230 are mounted on these shafts 228, respectively, and a chain 231 is passed around the sprockets 230, so that the sprockets move together as a unit. An extra sprocket 232 is secured on one of the shafts 228, as shown in FIG. 3, to rotate the shaft 228 as it is rotated.

The frame of the optical system also includes a generally upwardly extending arm 234 (FIG. 3). At each of the ends of the frame arm 234 a generally C-shaped bracket 235 is secured, and a pair of shafts 236, 237, are journalled between the upper and lower arms of each of these brackets respectively.

Figures 4, 5, 6:
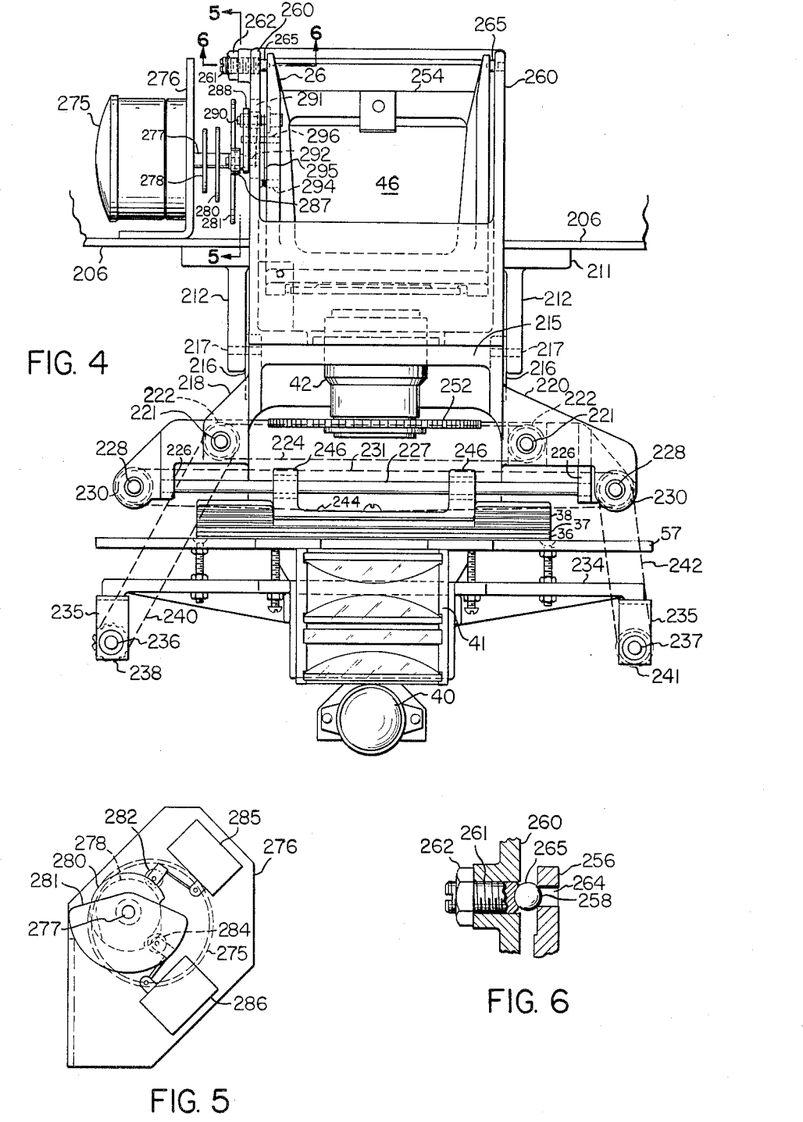
FIG. 4 is a top plan view thereof on a somewhat less enlarged scale, with parts of the frame, housing, and electrical control system omitted, for clarity.
FIG. 5 is a fragmentary section taken on the line 5—5 of FIG. 4, looking in the direction of the arrows, on an enlarged scale, and showing the cam followers and microswitches that are omitted from FIG. 4.
FIG. 6 is a fragmentary section taken on the line 6—6 of FIG. 4, looking in the direction of the arrows, and on an enlarged scale.

Referring now particularly to FIG. 4, a sprocket 238 is secured to the projecting lower end of the shaft 236, and a chain 240 is passed around the sprocket 238 and another sprocket (not shown) that is secured to the lower end of the shaft 221, so as to cause rotation of the shaft 221 upon rotation of the sprocket. Similarly, another sprocket 241 (FIG. 3) is secured to the projecting lower end of the shaft 237, and a chain 242 is passed about the sprocket 241 and the sprocket 232, to cause rotation of the sprocket 232 upon movement of the chain in response to rotation of the sprocket 241.

A generally C-shaped member 244 is formed with a pair of spaced arms 246, that are formed with aligned bores, and that are disposed with the shaft 227 passing through their bores. The chain 231 is secured to the arms 246 respectively to permit the member 244 to be moved along the shaft 227, either to the left or to the right relative to FIG. 4, upon movement of the chain 231.

A block 43 (FIG. 3), that has a stepped upper surface, is secured to the C-shaped member 244, and is mounted for sliding movement over the surface of a plate 57 that is supported and adjustably spaced from the frame arm 234. A plate 47, that has a generally C-shaped cross section, is mounted above the plate 57. While the plate 57 extends across the width of the condenser assembly 41, the plate 47 is smaller, and is set at one side of the condenser assembly so as not to obstruct the path of the light rays projected from the condenser assembly. An opaque mask 49 is mounted in the recess in the face of the plate 47, for sliding movement into and clear of the path of the light rays projected from the condenser assembly.

The film holder comprises a pair of transparent plates 36, 37. The plate 36 is mounted for sliding movement over the plates 47 and 57, and is seated on a step in the upper surface of the block 43. A spacer 39 is seated on an adjacent step in the plate, and the plate 37 is seated on the spacer. A transparent pressure plate 38 is also seated on the step in the upper surface of the block 43, adjacent the spacer 39. Spring means 53 is mounted on the arms 226, constantly to urge the plates 36, 37 and 38 into flat, face-to-face engagement. The plates 36, 37 and 38 are pinned together (not shown) in such a manner as to prevent relative sliding movement therebetween, but to permit the angular relative movement that is necessary to permit the insertion of transparencies between the plates 36 and 37.

A wheel 252 is mounted at the front end of the lens system 42, to permit fine adjustment of the focus as necessary during use of the machine.

Referring now particularly to FIGS. 1, 3 and 4 together, the knob 248 permits manual control over the elevation of the transparency that is held between the plates 36 and 37, and it is operatively connected to the upper end of the shaft 236 (FIG. 4). Similarly, the knob 250 (FIG. 1) permits manual control over the horizontal position of a transparency that is held between the plates 36 and 37, and it is operatively connected to the upper end of the shaft 237 (FIGS. 3 and 4).

The mirror 46 is mounted in a frame 254 that is formed with a pair of spaced, generally upright arms 256. The frame 254 is mounted for pivotal movement about a point 258 (FIGS. 3 and 6).

The frame of the reader-printer is formed with a pair of generally upright partitions 260 (FIGS. 3 and 4). Each of the partitions is formed with an aperture, and one of them, which is shown at the left in FIG. 4, is formed with a boss that has a threaded aperture in which a threaded member 261 is engaged. A lock nut 262 is mounted on the projecting outer end of the threaded fastener 261. The arms 256 of the mirror frame are also formed with apertures 264, as best shown in FIG. 6, and ball bearings 265 are interposed between the confronting apertures in the main frame partitions 260 and in the mirror frame arms 256. As shown in FIG. 6, the threaded member 261 is shaped at one of its ends with a cup-shaped recess, to receive the ball bearing 265, and the frictional resistance of the mirror frame 254 to pivotal movement can be adjusted by adjusting the pressure of the threaded member 261 against the ball bearing 265.

The mirror frame 254 has a bar 266 at its front end across its upper marginal portion, in position to engage against the lower end of a bolt 267 that projects downwardly from a part 268 of the frame. The bolt 267 can be adjusted in an upward or downward direction, to control the upper limit of pivotal movement of the mirror frame 254 by engagement against the bar 266.

The reader-printer frame is formed with a cradle 270 (FIG. 3) to receive and support the mirror 46 when the mirror is in its lower position. The cradle 270 is a generally rectangular frame that is formed with a central opening to provide a path for the light rays that are arranged about the optical axis C when the mirror 46 is in its upper position as shown in FIG. 3. A bumper 271 is secured to an upstanding lip at the back of the cradle 270, and a cushion 272 is mounted about the sides and front of the cradle 270 around the central opening thereof, to minimize shock when the mirror drops from its upper to its lower position. Clamps 274 are mounted in the front corners of the mirror 46 to secure it in its frame.

The motor 275 (FIG. 4) for moving the mirror 46 is mounted on a bracket 276 that is secured to the reader-printer frame member 206. The drive shaft 277 of the motor projects through an opening in bracket 276. Three cams 278, 280 and 281 are mounted in axially-spaced relation on the shaft 277, and these cams will be referred to hereafter respectively as the mirror motor holding cam 278, the lamp control cam 280, and the mirror tilting cam 281. The followers 282, 284 (FIG. 5) for the cams 278, 280 respectively, are mounted to operate the armatures of microswitches 285, 286, respectively. The follower 287 (FIG. 4) for the mirror tilting cam 281 is mounted on a shaft that is journalled in one end of a link 288, and that is formed with a reduced end 292 that is disposed to project into an aperture 291 in the arm 260 of the optical assembly frame. A pin 290 is mounted to project from the arm 256 of the mirror frame 254 into the aperture 291. The other end of the link 288 is rotatably secured to the pin 290.

Two pins 294, 296 are mounted in mutually spaced relation in the arm 256 of the mirror frame 254, to project into the aperture 291. A wire spring 295 is coiled about the pin 290 and has one free end that is engaged against the reduced shaft end 292 and a second free end that is engaged against the pin 294, as best shown in FIG. 3.

*Control system*

Figure 10:
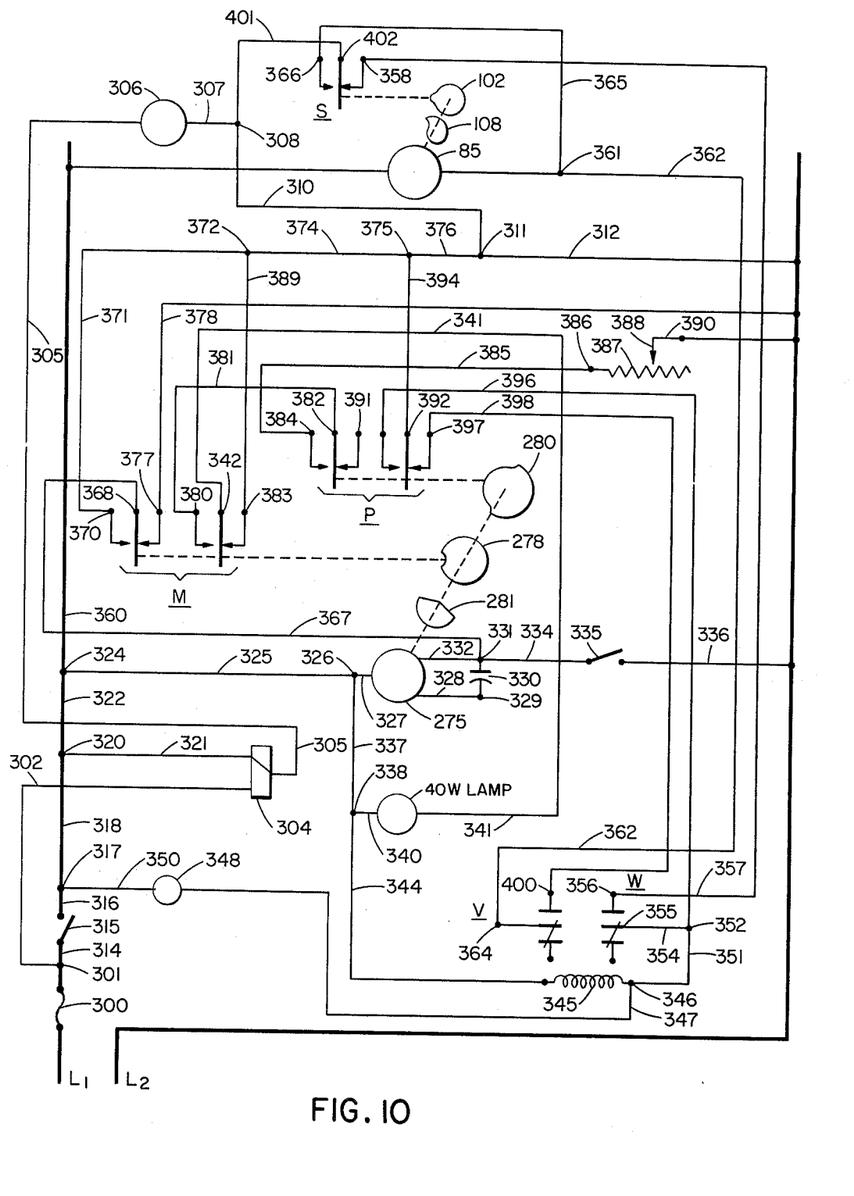
FIG. 10 is a schematic diagram of an electromechanical circuit and cam arrangement, showing one way in which the apparatus can be wired, automatically to carry out the photographic reproduction steps in accordance with one embodiment of this invention.

Referring now in detail to FIG. 10, the source of power for the machine is furnished from the usual two lines, $L_1$ and $L_2$. The Line $L_1$ is connected through a fuse 300 to a junction 301. A line 302 interconnects the junction 301 with a thermally controlled switch 304. The thermal switch 304 is shown in one of its two positions, in which the circuit is open to the line 302. The switch 304 is connected, through its common terminal, by a line 305 to a blower motor 306, that is connected to a fan (not shown) for cooling the interior of the reader-printer. The blower motor 306 is also connected through a line 307 to a junction 308. The junction 308 is connected through a line 310, a junction 311, and another line 312, to the line $L_2$.

The junction 301 is also connected through a line 314 with one terminal of the main switch 315. The other terminal of the main switch 315 is connected through a line 316 with the junction 317. The junction 317 is connected through a line 318 with a junction 320, which is connected through a line 321 with one terminal of the thermally controlled switch 304. The junction 320 is also connected through a line 322 with a junction 324, which in turn is connected through a line 325, a junction 326, and a line 327 with a first terminal of the mirror tilting motor 275. A second terminal of the mirror tilting motor 275 is connected through a line 328, a junction 329, the motor capacitor 330, a junction 331, and a line 332, with the first terminal of the motor. The junction 331 is also connected through a line 334 to one terminal of the manual switch 335, the other terminal of which is connected through the line 336 with the line $L_2$.

The junction 326 is also connected through a line 337 to a junction 338. The junction 338 is connected through a line 340 to one terminal of the projection lamp 40, and the other terminal of the lamp 40 is connected through a line 341 with the armature 342 of a double pole double throw switch M.

The junction 338 is also connected through a line 344 with one terminal of a relay coil 345, the other terminal of which is connected to the junction 346. The junction 346 is connected through a line 347 with one terminal of a pilot lamp 348, the other terminal of which is connected through a line 350 with the junction 317.

The junction 346 is also connected through a line 351 to a junction 352. The junction 352 is connected through a line 354 with the armature 355 of a relay V.

One terminal 356 of the relay V is connected through a line 357 with one terminal 358 of a single pole single throw switch S (at the microswitch 285).

The junction 324 is also connected through a line 360 with one terminal of the process motor 85, the other terminal of which is connected to a junction 361. The junction 361 is connected through a line 362 with the armature 364 of the relay V. The terminal 361 is also connected through a line 365 with one contact terminal 366 of a single pole single throw switch S.

The junction 331 is also connected through a line 367 to the armature 368 of the double pole double throw switch M. The other contact terminal 370, that can be connected to the common armature 368 that also serves the terminal 377, is connected through a line 371, a junction 372, a line 374, a junction 375, a line 376, the junction 311, and the line 312, with the line $L_2$. The other contact terminal 377, that is served by the armature 368, is connected through a line 378 with the line $L_2$.

One contact terminal 380, that is served by the other armature 342 of the double pole double throw switch M, is connected through a line 381 with the armature 382 of the double pole double throw switch P. The other contact terminal 383, that is served by the armature 342, is connected through a line 389 to the junction 372.

One of the contact terminals 384, that is served by the armature 382 of the double pole double throw switch P, is connected through a line 385 to a junction 386, that is connected to one terminal of a rheostat coil 387. The armature 388 of the rheostat is connected through the line 390 to the line $L_2$.

The contact terminal 391, that is served by the armature 382 of the switch P, is unconnected and provides a means for placing the armature 382 in an open circuit position.

The other armature 392 of the switch P is connected through a line 394 with the junction 375. One of the contact terminals 395, that is adapted to cooperate with the armature 392, is connected through a line 396 with the junction 352. The other contact terminal 397, that can be connected to the armature 392, is connected through a line 398 to a contact terminal 400 of the relay V.

The junction 308 is also connected through the line 401 to the armature 402 of the single pole single throw switch S.

Operation

To place the reader-printer in operation, a roll 21 of sensitized paper is loaded into the machine and is threaded into place over the glass plate 50, so that the leading edge of the paper is engaged under the rollers 24. Loading is easily done by removal of the superstructure of the reader-printer and of the pressure pad 72.

The main switch 315 of the reader-printer is then moved to its closed position. This completes a circuit from the line $L_1$, through the fuse 300, the junction 301, the line 314, the main switch 315, the line 316, the junction 317, the line 318, the junction 320, the line 322, the junction 324, the line 325, the junction 326, the line 337, the junction 338, the line 340, the projection lamp 40, the line 341, the armature 342 of one side of the switch M, which, since it is in its normally closed position, has a circuit completed from its armature 342 through its contact terminal 383, and from the terminal 383 through the line 389, the junction 372, the line 374, the junction 375, the line 376, the junction 311, and the line 312, to the line $L_2$. Accordingly, the projection lamp 40 is energized and the reader-printer may be used for viewing transparencies. The transparency to be viewed is placed between the holder plates 36, 37, and the enlarged, projected image of the transparency is reproduced on the frosted glass viewing screen 45.

After the operator has examined a particular transparency and has selected it for reproduction, the use of the reader-printer to make a printed reproduction is simple and automatic. The operator moves the switch 335 to its closed position. The switch may be released almost immediately.

When the "print" switch 335 is closed, the following circuits are completed, beginning at the junction 326, which is already operatively connected to the power line $L_1$ as previously described: through the line 327, the mirror motor 275, the line 332, the junction 331, the line 334, the print switch 335, and the line 336, to the power line $L_2$; and also, from the junction 331, through the line 367, through one armature 368 of the switch M, which, in the normally closed position of the switch, is in electrical contact with the contact terminal 377, so that the circuit is completed from the contact terminal 377, through the line 378, to the power line $L_2$.

As soon as the mirror motor 275 is energized and rotates, the mirror motor holding cam 278 rotates, and the armature 368 of the switch M, which is operatively connected to the cam follower 282, is shifted from its normally closed position in contact with the contact terminal 377, into contact with the other contact terminal 370. This completes a circuit from the junction 326, through the mirror motor 275, the line 332, the junction 331, the line 367, the armature 368, the contact terminal 370, the line 371, the junction 372, the line 374, the junction 375, the line 376, the junction 311, and the line 312, to the power line $L_2$.

At the same time, the other armature 342 of the switch M, which is also operatively connected to the cam follower 282, is shifted from its normally closed position in contact with the terminal 383, into electrical contact with its other terminal 380. The projection lamp circuit, which had been closed, is now opened, and the projection lamp goes out.

The mirror tilt cam 281 is also rotated as the mirror motor 275 operates, and the cam follower 287, that follows the mirror tilt cam 281, moves in such a way as to move the link 288 to raise the mirror 46 to its upper position (shown in FIG. 2), in which it can intercept a projected image and direct it downwardly along the optical axis C.

As the follower 287 is moved upwardly on the surface of the mirror tilt cam 281, the link 288 inclines upwardly, in a clockwise direction relative to FIG. 3. The free end of the wire spring 295, that is engaged against the pin 292 in the upper position of the mirror (as shown in FIG. 3), is engaged on the pin 296 in the lower position of the mirror. As the cam action moves the cam follower 287 up, the pin 292 engages the spring and lifts it off the pin 296, then carries it up further to compress the spring. The resistance of the spring to compression results in a force that is applied to the pin 294, to lift the pin 294 and to tilt the mirror until the bar 266 engages against the adjusting screw 267. When the cam follower is lowered, the action of the spring causes the mirror to be returned to its lower position with a resilient but gentle action.

When the mirror 46 has reached its upper position, the lamp control cam 280 has been rotated on the shaft 277 of the mirror motor 275 through a sufficient angle to shift the armatures of the switch P. A circuit is made from the junction 326, through the line 337, the junction 338, the line 340, the projection lamp 40, the line 341, the armature 342 of the switch M, the contact terminal 380, the line 381, the armature 382 of the switch P, the contact terminal 384, the line 385, the junction 386, the rheostat coil 387, the rheostat armature 388, and the line 390, to the power line $L_2$. The projection lamp 40 is again energized. However, whereas the lamp previously had been illuminated for viewing at its full brilliance, it is now illuminated at some lesser degree of brilliance for making a photographic reproduction. The reduction in brilliance can be adjustably controlled by the machine operator by adjusting the position of the rheostat armature 388.

At the same time, another circuit becomes completed from the junction 326, through the line 337, the junction 338, the line 344, the relay coil 345, the junction 346, the line 351, the junction 352, the line 396, the contact terminal 395 of the switch P, the armature 392, the line 394, the junction 375, the line 376, the junction 311, and the line 312, to the power supply line $L_2$. Also at the same time, a circuit is completed from the junction 317, through the line 350, an "expose warning" lamp 348, and through the line 347, to the junction 346, which in turn is connected in the manner just described to the power supply line $L_2$, so that the "expose warning" lamp 348 turns on to indicate that a transparency is being reproduced.

When the relay coil 345 is energized, the armatures of the relay shift from the position indicated in FIG. 10 to engage the armature 355 with the contact terminal 356, and the armature 364 with the contact terminal 400.

When the relay coil 345 is energized, the reader-printer is placed in readiness for the next automatic step of processing the exposed paper. Exposure of the paper continues until the lamp control cam 280 has been turned far enough to permit the return of the switch P to the position shown in FIG. 10. When this happens, one circuit is broken, and two are completed. First, the lamp 40 is turned off when the armature 382 of the switch P is dropped back into contact with the contact terminal 391. One of the circuits that is completed is from the junction 346 at one terminal of the relay coil 345, through the line 351, the junction 352, the line 354, the armature 355, the terminal 356, the line 357, the contact terminal 358 of the switch S, the armature 402 of the switch S, the line 401, the junction 308, the line 310, the junction 311, and the line 312, to the power line L₂ The second circuit that is completed turns on the process motor, and extends from the junction 324, that is operatively connected to the power line L₁ in a manner previously described, through line 360, through the process motor 85, the junction 361, the line 362, the armature 364 of the relay V, the contact terminal 400 of the relay, the line 398, the junction 397 of the switch P, the armature 392 of the switch P, the line 394, the junction 375, the line 376, the junction 311, and the line 312, to the power line L₂.

The process motor 85 is turned on while the mirror tilting motor 275 is still running. However, as the mirror motor holding cam 278 completes its full single revolution, soon after the process motor 85 is started the switch M is returned to the position shown in FIG. 10. Before the switch M resumes the position shown in FIG. 10, the three cams that are rotated upon rotation of the shaft of the process motor 85, namely, the process motor holding cam 102, the knife cam 108, and the paper feed cam 114, have begun to be rotated, in the following manner.

The process motor 85 drives the gear 92, which in turn drives the pinion 117, which in turn drives the gear 126, and through the gear train including the gear 126, the pinion 127, the pinion 130, and the pinion 132, drives the shaft 120 on which the paper transport rollers 24 are mounted. The rotation of the shaft 116 also causes rotation of the gear 118, which in turn drives the pinion 112 and causes rotation of the shaft 98. Rotation of the shaft 98 causes rotary movement of the three cams that are mounted on that shaft, that is, the process motor holding cam 102, the knife cam 108, and the paper feed cam 114.

As the process motor holding cam 102 begins to be rotated after the process motor 85 has been turned on, the armature 402 of the switch S is shifted from the position shown in FIG. 10 to make electrical contact with the terminal 366. This completes a circuit from the junction 324, that is in electrical contact with the power line L₁ in a manner previously described, through the line 360, the process motor 85, the junction 361, the line 365, the contact terminal 366 of the switch S, the armature 402 of the switch S, the line 401, the junction 308, the line 310, the junction 311, and the line 312, to the power supply line L₂, to hold the process motor in operation.

Shortly after the process motor holding cam 102 has been rotated sufficiently far to shift the armature 402 of the switch S into engagement with the contact 366, to hold the process motor in operation, the mirror motor 275 completes its revolution. The mirror motor hold cam 278 then permits the switch M to resume the position shown in FIG. 10, and the mirror motor is turned off.

When the armature 402 disengages the terminal 358 of the switch S and engages the terminal 366, the circuit including the relay coil 345 is broken, and the relay coil 345 becomes de-energized, so that the relay armatures drop back into the position shown in FIG. 10. This completes a circuit to energize the lamp 40, in a manner previously described, and the lamp again comes on at full brilliance. The cams are arranged so that the projection lamp 40 does not come on until the mirror 46 has been dropped down to its lower position so that it does not intercept any light from the lamp 40.

The paper feed cam 114 is formed so that its follower 115, that controls the elevation of the yoke 121 and therefore of the paper transport rolls 24, holds the rolls 24 out of engagement with the paper for a period of time that is dependent upon the length of paper that is to be advanced. If a short length of paper is to be advanced, the rolls 24 are held out of engagement with the paper for a relatively long period of time. Conversely, if the longest length of paper possible has been exposed and is to be advanced, the period of time during which the rollers 24 are held out of engagement with the paper will be extremely short. The duration of this period can be controlled by the machine operator, by adjusting the position of the inner shaft 100 relative to the outer shaft 98, by means of the wheel 101; this adjusts the angular position of the paper feed cam 114 relative to the knife cam 108.

When the drive shaft 88 of the process motor 85 is rotated, it also drives the pulley 90, the belt 91, and the pulley 176. This drives the shaft 174 and thus drives all of the rollers of the processing section.

When the rolls 24 are dropped down, they engage the exposed paper and advance it. The leading edge of the paper engages between the applicator rollers 26, and processing liquid from the first tank 160 is applied to the lower surface of the paper and to the exposed emulsion. The paper is further advanced from the rolls 26 toward the second tank 161, and passes between the guides 28 and 30. The paper then passes over the vane 31, and is wetted by the liquid from the second processing tank. The vane guides the paper up between the squeegee rolls 32, which remove any surplus liquid, and deliver a substantially dry photographic reproduction through the chute 34.

As the shaft 98 is rotated, the knife cam 108 is also rotated, and as the trailing edge of the exposed portion of the paper reaches the anvil 155, the knife cam follower 111, following the surface of the knife cam 108, drops down suddenly. The knife and its frame are sufficiently heavy, so that its weight, together with the downward force exerted by the springs 152, drops the knife down rapidly and with great force. The force exerted by the springs 145 urges the knife blade against the anvil as it drops down, thus insuring a clean cut.

The paper feed cam 108 is formed to cause the yoke 121 to be raised up, and thereby to cause the paper advancing rolls 24 to disengage the paper, immediately after the paper has been engaged between the applicator rolls 26. When the knife servers the paper, the paper is still in motion, but it is being drawn by the rolls 26, and is no longer engaged by the rollers 24.

The processing section of the reader-printer is designed to deliver a fully developed, substantially dry print within a few seconds after the operator has commanded the machine to make a print.

After the process motor has operated for a sufficiently long time to cause the shaft 98 to be driven through a complete single revolution, the process motor holding cam 102 permits the armature 402 of the switch S to disengage the contact terminal 366 and make electrical contact with the terminal 358. This breaks the circuit including the process motor 85, and shuts off the process motor. At this point, the knife cam 108 has been rotated sufficiently to raise the knife back up clear of the anvil, and the paper transport rolls 24 are disengaged from the paper.

*General*

While the reader-printer can be used conveniently and economically to produce multiple photographic reproductions of a uniform size, it is also a relatively simple matter to adjust the size of the print that is produced. A simple rotary adjustment of the wheel 101, to adjust the angular positions of the inner shaft 100 relative to the outer shaft 98 and of the paper feed cam 114 relative to the knife cam 108, can change the amount of paper that is advanced after each exposure.

The area of the paper that is exposed, and the size of the reproduction made, can also be adjusted. For example, the mask 49 can be shifted laterally, to obstruct a part of the path of the light rays from the condenser assembly 41. By viewing the reduced size image on the viewing screen and adjusting the position of the mask as necessary, an image of a desired size can be obtained. Preferably, knowing the standard enlargement that is obtained at the viewing screen with a given machine, indicia 408 are applied to the bezel immediately below the viewing screen. The knob 410 (FIG. 1) can be connected to the wheel 101 to rotate the wheel upon rotation of the knob, and a scale 412 can be applied about the knob 410. Both the indicia 408 and the scale 412 can be calibrated to correspond to the length of the reproduction that is to be made. Adjustment of the mask to show an image of a given length on the viewing screen, as measured against the indicia 408, and rotary adjustment of the knob 410, to cause the rolls 24 to advance the selected length of paper, are all that are necessary to make a reproduction of any desired length within the capacity of the machine. Since the machine can be supplied with paper rolls of any desired width, reproductions of many different sizes can be produced.

Referring to FIG. 1, with the mechanical arrangement for paper feeding and cutting shown, the mask would always be used to reduce the length of the drawing from the left to the right of the viewing screen, and this necessarily would reduce the length of paper exposed from the left to the right, in the exposure plane.

One of the advantages of the reader-printer that has been described is that the operator can use the machine to view a transparency even while a print is being made from a previous transparency. This permits maximum utilization of the machine. In a typical operation of the machine, using a "stabilized" paper that contains a latent developing agent in the emulsion, the processing liquids that are applied sequentially are the activator, that activates the developer, and a stabilizer. In a typical operation of the machine with one type of paper of this kind, the machine was designed with a thirty-second cycle from the time the operator pressed the print switch 335 to the time the finished print was delivered, ready for use. In this thirty-second cycle, the initial five seconds were required for exposure and for return of the tilting mirror to its normal, lower position, and the other twenty-five seconds were required for processing. Except for the initial five second period for exposure, during this cycle, the machine was available for viewing.

Other advantages of the reader-printer of this invention derive from the photographic processing system. For example, if a light-weight, translucent "stabilized" paper is used, the prints obtained are also translucent and can be used as masters for the production of additional, inexpensive diazo process prints. Since the paper is only slightly moistened in the developing process, paper strength is not deteriorated as might occur in "wetter" processes.

Another important advantage of the reader-printer of this invention is that both the paper and the chemical processing liquids are at table height to permit easy access, and the mechanism is also at a convenient height. To supply processing liquids to the tanks, it is preferred to use the system that is described in the copending patent application of Daniel H. Robbins, Milfred H. Craft, John R. Kane, and Edmund J. Pierce, filed on December 1, 1961, application Serial No. 156,289, now U.S. Patent No. 3,173,577. However other liquid supply systems can be used.

While the specific embodiment of the invention described above contemplates the use of a silver halide emulsion as the photosensitive medium, the invention contemplates the use of other photosensitive media. For use with the silver process, the machine is advantageous for many reasons. The use of supply rolls of paper is economical. Exposure of the paper on its lower surface, through the glass plate of the reader-printer, with provision for advancing the paper from above by rotating rolls that engage the upper surface of the paper adjacent its leading or severed edge, permits efficient use of the paper, with minimum waste. With paper advancing techniques utilized in the past, it had been customary to use some means for advancing the paper that engaged the roll not only on its back, non-sensitized surface, but also on its sensitized surface; for example, it has been common to employ a pair of rolls to grip the paper between them. With such an arrangement, the area of the sensitized paper that is covered by one of the rolls cannot be exposed and is wasted. By way of contrast, in the mechanism of the present invention, only an extremely small area of the sensitized paper, that is positioned directly over the anvil, cannot be exposed.

Another important and advantageous feature of the invention is the film holding arrangement. To insert a transparency in the machine, the pressure pad 38 is pushed back, and the transparency is inserted between the plates 36 and 37. The pressure pad 38 is then released, and it presses the plates 36 and 37 together, to keep the transparency flat and in the projection plane. To adjust the position of the image of the transparency, on the viewing screen, the position of the holder is adjusted, in the following way.

To adjust the elevation of a transparency, the knob 248 (FIG. 1) is adjusted angularly, to rotate the shaft 236 (FIG. 4) and sprocket 238, to drive the chain 240, to rotate the sprockets 222 and the shafts 221, to move the collars 225 and their arms 226 up or down, thereby to change the elevation of the shaft 227, of the member 244 that is carried on the shaft, and of the block 43 and the plates 36, 37 and 38 that are supported from the block 43. The block 43 and the plate 36 slide over the face of the fixed plate 57, and the plate 36 also slides over the face of the mask holder 47.

To adjust the horizontal position of a transparency, the knob 250 is rotated, to rotate the shaft 237 and the sprocket 241, to move the chain 242, to rotate the sprocket 232, the shaft 228, on which it is mounted, and the sprocket 230 on that shaft, to move the chain 231, and thereby shift, in one horizontal direction or the other, the member 244, which is caused to slide along the shaft 227 upon movement of the chain 231. Movement of the member 244 causes similar movement of the block 43 and of the plates 36, 37 and 38, that are supported on the block.

To clean the plates 36 and 37, it is merely necessary to release them from the pressure pad 38, and lift them out. This is a particularly convenient feature of this invention.

Moreover, the projection system is versatile and can project images of translucent or transparent articles of many different kinds.

Although the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinabove set forth, and as fall within the scope of the invention or the limits of the appended claims.

What is claimed is:

1. A photographic viewing and reproducing apparatus, comprising a dark chamber, means for supplying to said dark chamber photosensitive sheet material in the form of an elongate web, means for holding a portion of said web in a focal plane in said dark chamber, a viewing screen disposed externally of said dark chamber, light ray projecting means, means for holding a transparency in the path of light rays from said projecting means, means disposed to project light rays from said projecting means onto said viewing screen to form an image thereon, an opaque mask that is movable into the path of light rays from said light projecting means to permit adjustment of the size of the image on the viewing screen to correspond to a desired size of a photographic reproduction thereof, means mounted to be movable into a position to intercept the light rays projected through a transparency and past said mask to divert them into said dark chamber, means to direct the diverted light rays onto said focal plane to expose at least a part of said photosensitive material therein to form a latent photographic reproduction having the desired size, means to transport the exposed part of said sheet material from said focal plane while simultaneously drawing an unexposed portion of the web of equal size into the focal plane, and means to sever the exposed part of the web from the unexposed remainder along a line of severance when said unexposed portion is in said focal plane, said mask being disposed always to reduce the size of the image in a direction toward the line of severance.

2. A viewer printer comprising:
a cabinet;
means dividing said cabinet into a viewing chamber having a viewing screen associated therewith and having light therein owing to the presence of said viewing screen and into a substantially light-tight printing chamber;
photosensitive printing means positioned within said printing chamber;
means for projecting a light image at said viewing screen;
light interception means for preventing light within said viewing chamber from entering said printing chamber from said viewing chamber when said interception means is in a first non-intercept state and for intercepting said light image to divert same into said light-tight printing chamber when said interception means is in a second intercept state;
control means for sequentially rendering inoperative said means for projecting, thereafter causing said light interception means to assume said second intercept state, thereafter rendering operative said means for projecting to expose photosensitive printing media associated with said printing means, thereafter rendering inoperative said means for projecting, thereafter causing said light interception means to again assume said first non-intercept state, and again rendering operative said means for projecting thereby to provide for further viewing during the transportation and development of the photosensitive media associated with said printing means;
a development station;
a first media transportation means for advancing the exposed portion of said media out of the exposure plane of said printing means after said light interception means again assumes said first non-intercepting state while simultaneously advancing an unexposed portion of said media into said exposure plane;
second media transportation means for receiving said exposed portion and forwarding same to said development station; and
means positioned between said first and second transportation means for severing the exposed portion of said media from the unexposed portion.

3. The combination as set forth in claim 2 wherein a transparent plate is disposed to be engaged by the lower surface of said media and wherein said first media transportation means comprises a roller member that is disposed to be engageable against said media on the surface of said media that is remote from said transparent plate.

References Cited by the Examiner
UNITED STATES PATENTS

| | | | |
|---|---|---|---|
| 2,073,304 | 3/1937 | Hopkins | 88—24 |
| 2,230,251 | 2/1941 | Jochum | 95—42 |
| 2,256,397 | 9/1941 | Luboshez | 88—24 |
| 2,517,414 | 8/1950 | Pratt et al. | 88—24 |
| 2,773,418 | 12/1956 | Perzentka et al. | 88—24 |
| 2,780,154 | 2/1957 | Musho | 95—75 |
| 2,885,834 | 10/1958 | Doster | 95—75 |
| 2,985,068 | 5/1961 | Ness | 88—24 |
| 3,002,434 | 10/1961 | Reuter | 88—24 X |
| 3,011,963 | 12/1961 | Johnson et al. | 88—24 |
| 3,055,266 | 9/1962 | Frantz et al. | 88—24 |
| 3,073,214 | 1/1963 | Haviland | 88—24 |

NORTON ANSHER, *Primary Examiner.*
EMIL G. ANDERSON, EVON C. BLUNK, *Examiners.*